United States Patent [11] 3,620,477

[72] Inventor Edward Michael Penn
7 Rego Court, Huntington Station, N.Y. 11746

[21] Appl. No. 824,456
[22] Filed May 14, 1969
[45] Patented Nov. 16, 1971

[54] DATA PROCESSING TAPE RING CARTRIDGE
2 Claims, 5 Drawing Figs.

[52] U.S. Cl. 242/197, 206/52 F, 242/71.1
[51] Int. Cl. G11b 23/10
[50] Field of Search 242/71.1, 71.2, 197, 198, 209, 210, 208, 71.8; 206/52, 52 F

[56] References Cited

UNITED STATES PATENTS

| | | | |
|---|---|---|---|
| 2,822,919 | 2/1958 | Kulka | 206/52 F |
| 3,235,067 | 2/1966 | Hultgren | 206/52 F |
| 3,286,829 | 11/1966 | Lyman et al. | 206/52 F |
| 3,311,228 | 3/1967 | Kulka | 206/52 F |
| 3,343,667 | 9/1967 | Tellen | 206/52 |
| 3,371,882 | 3/1968 | Orlando et al. | 242/209 |
| 3,375,990 | 4/1968 | Hultgren | 242/71.1 X |

*Primary Examiner*—George F. Mautz
*Attorney*—Edward H. Loveman

ABSTRACT: This invention relates to a protective ring cartridge for magnetic tape reels which does not interfere with the normal use of said reel in a machine. The cartridge is comprised of a flexible ring with protruding frictionless lips which permit its attachment to a tape reel. The frictionless protruding lips fit into a groove cut into the outer circumference of the tape reel. The frictionless protruding lips permit free rotation of the reel while maintaining air seals between the cartridge and the tape reel.

DATA PROCESSING TAPE RING CARTRIDGE

A peripheral slot having an adjustable closure is provided in the case for tape entry and exit. In accordance with the present invention in the protective ring cartridge is always mounted in circumferential relationship with respect to the tape reel whether the tape is in storage or in use in a machine. This feature simplifies the changing of reels since it is not necessary to remove the protective ring cartridge from the reel prior to inserting the reel into a machine for use.

Other features of the invention will be explained in the following description and claims. The accompanying drawings will illustrate the principles of the invention and the best way of applying these principles.

DESCRIPTION OF THE INVENTION

Figure 1:
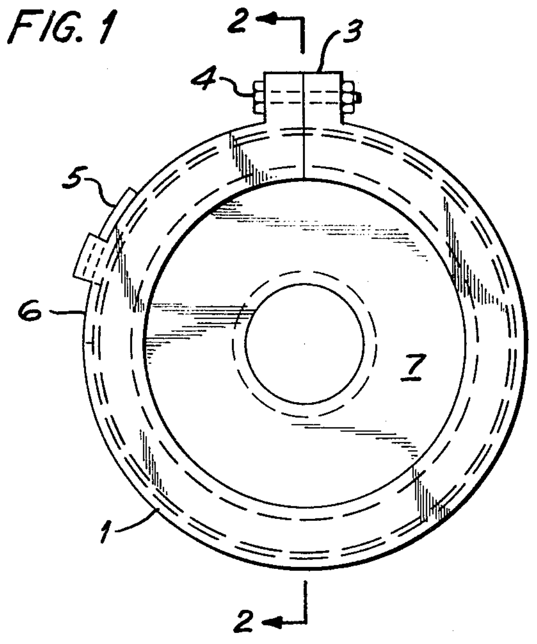
FIG. 1 is a side view of the ring cartridge mounted on a reel with the sliding closure shown in the open position.
Figure 2:
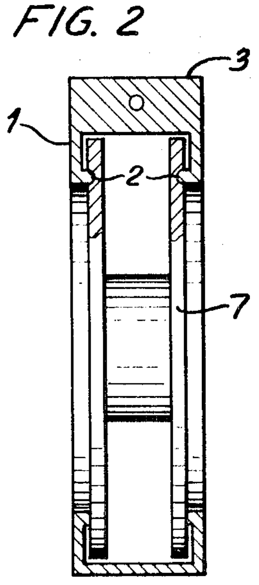
FIG. 2 is a sectional view along the line 2—2 in FIG. 1 of the protective ring cartridge mounted on a tape reel.
Figure 4:
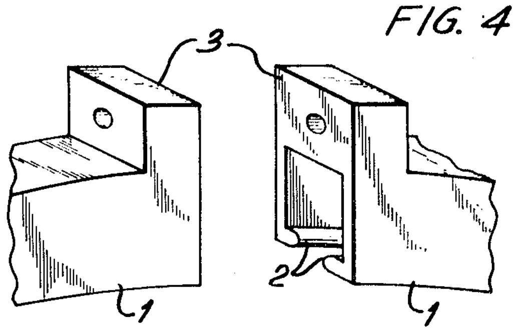
FIG. 4 is a partial perspective view of the protective ring cartridge clamping mechanism in the nonclamping or open position.
Figure 5:
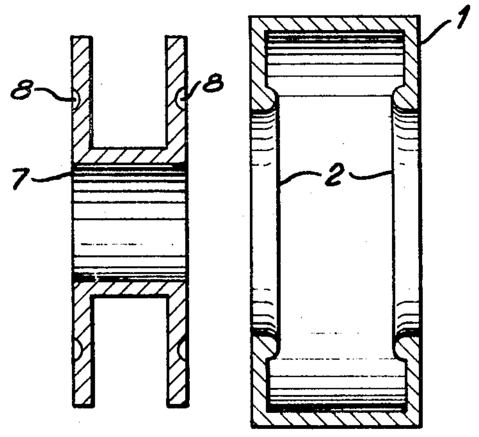
FIG. 5 is a sectional view of a tape reel and a protective ring cartridge placed side by side.

With reference to the drawings there is shown in FIG. 1 a conventional tape reel 7 with the protective ring cartridge 1 mounted around the outer circumference edges of the reel 7. The cartridge 1 is locked around the reel by means of a latch mechanism 3 which is locked closed by a nut and bolt assembly 4. FIG. 4 shows the same latch area in the open position. When the cartridge is mounted on a reel the adjacent parallel faces of the latch assembly 3 are joined by the nut and bolt assembly 4 which passes through the holes shown drilled in the latch faces 3.

The protective ring cartridge is molded into a U-shaped channel form out of flexible yieldable material, preferably plastic. A flat ring gasket 2 is bonded to the bottom of the sidewalls of the cartridge. This gasket is made of frictionless plastic to allow free rotation of a tape reel 7 within a mounted cartridge. The frictionless gasket 2 fits into a groove cut into the outer circumference of the reel 7 to form a nonbinding airtight seal between the cartridge 1 and the reel 7. The width of the space between the parallel faces of the frictionless gaskets 2 is less than the width of a tape reel. Therefore, when the reel is placed within a cartridge, pressure is exerted inwardly by the flexible sidewalls of the cartridge 1 to force the gaskets into the tape reel groove 8.

Figure 3:
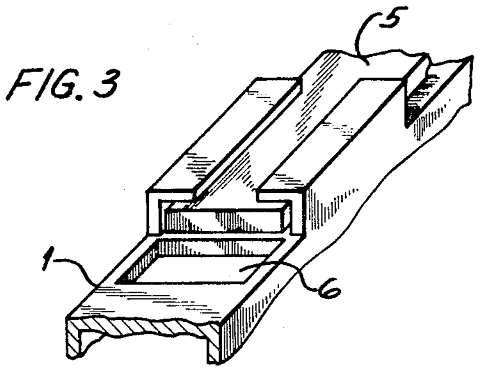
FIG. 3 is a partial perspective view of the protective ring cartridge sliding closure mechanism in the open position.

Tape enters and exits from the mounted cartridge through the open port 6 shown in FIG. 1 and 3. A small rectangular plate 5 is slidably engaged in the cartridge. This plate may be moved circumferentially of the case to close port 6. This plate may, of course, serve as a clamp for the tape reel leader which is not shown.

When mounted the cartridge touches the reel only at the frictionless gasket lips 2 and tape groove 8 areas. The reel can, therefore, rotate freely within the mounted cartridge.

In operation, the cartridge containing the reel is placed in a machine which drives the reel directly through a drive hub which is not shown. The frictionless cartridge lips 2 allow slippage to occur when the reel is so driven and thus free independent motion of the reel occurs. Tape passes from the rotating reel through the open exit port 6 of the nonrotating cartridge into the tape-using machine.

What is claimed is:

1. A protective cover device for rotatably enclosing a reel of tape comprising
   - a U-shaped split annular member enclosing the periphery of said reel
   - means for locking said member around the periphery of said reel,
   - a port means in said member for permitting the tape on said reel to enter and exit therethrough, and
   - a frictionless gasket means bonded to each of the legs of said U-shaped member and engaging said reel whereby said cover device seals said tape reel and permits free rotation thereof within said cover device.

2. A protective cover device as recited in claim 1 wherein said port means includes a port and a closure plate for covering at least a portion of said port.

* * * * *